US008837918B2

(12) United States Patent
Nishigaki

(10) Patent No.: US 8,837,918 B2
(45) Date of Patent: Sep. 16, 2014

(54) VIDEO RECORDING APPARATUS

(75) Inventor: Tomoo Nishigaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 74 days.

(21) Appl. No.: 12/991,702

(22) PCT Filed: Apr. 30, 2009

(86) PCT No.: PCT/JP2009/058444
§ 371 (c)(1),
(2), (4) Date: Nov. 9, 2010

(87) PCT Pub. No.: WO2009/139303
PCT Pub. Date: Nov. 19, 2009

(65) Prior Publication Data
US 2011/0058794 A1  Mar. 10, 2011

(30) Foreign Application Priority Data
May 16, 2008  (JP) ................... 2008-129555

(51) Int. Cl.
*H04N 5/917* (2006.01)
*H04N 5/85* (2006.01)
*G11B 20/00* (2006.01)
*H04N 19/115* (2014.01)
*H04N 19/156* (2014.01)
*H04N 19/152* (2014.01)
*H04N 19/124* (2014.01)
*H04N 19/154* (2014.01)
*H04N 19/192* (2014.01)
*H04N 5/76* (2006.01)
*H04N 19/40* (2014.01)
*G11B 20/10* (2006.01)
*H04N 9/804* (2006.01)
*H04N 5/91* (2006.01)
*H04N 9/79* (2006.01)
*H04N 5/781* (2006.01)

(52) U.S. Cl.
CPC ............ *H04N 5/85* (2013.01); *G11B 20/00007* (2013.01); *G11B 2220/2562* (2013.01); *H04N 19/0006* (2013.01); *G11B 2020/10537* (2013.01); *H04N 19/00206* (2013.01); *H04N 9/8042* (2013.01); *H04N 19/00193* (2013.01); *H04N 19/0009* (2013.01); *H04N 19/002* (2013.01); *G11B 2220/2541* (2013.01); *H04N 5/91* (2013.01); *H04N 9/7921* (2013.01); *H04N 5/781* (2013.01); *H04N 19/00357* (2013.01); *H04N 5/76* (2013.01); *H04N 19/00472* (2013.01)
USPC ......................................................... 386/328

(58) Field of Classification Search
USPC ............ 348/231; 375/240; 386/238, 294, 328
See application file for complete search history.

(56) References Cited

U.S. PATENT DOCUMENTS

| | | | |
|---|---|---|---|
| 6,366,614 B1 | 4/2002 | Pian et al. | |
| 6,459,850 B1 * | 10/2002 | Bruls | 386/294 |
| 6,654,417 B1 * | 11/2003 | Hui | 375/240.03 |
| 6,697,567 B1 * | 2/2004 | Suzuki | 386/238 |
| 6,879,632 B1 * | 4/2005 | Yokoyama | 375/240.13 |
| 2003/0174771 A1 * | 9/2003 | Sugahara et al. | 375/240.03 |
| 2004/0022316 A1 | 2/2004 | Ueda et al. | |
| 2004/0213346 A1 | 10/2004 | Matsumura et al. | |
| 2005/0058198 A1 | 3/2005 | Zhao et al. | |
| 2005/0089092 A1 | 4/2005 | Hashimoto et al. | |
| 2005/0123048 A1 * | 6/2005 | Kondo et al. | 375/240.16 |
| 2006/0018553 A1 | 1/2006 | Lee | |
| 2006/0274830 A1 | 12/2006 | Koto | |
| 2007/0036214 A1 | 2/2007 | Araki | |
| 2009/0225193 A1 * | 9/2009 | Ishii | 348/231.99 |

FOREIGN PATENT DOCUMENTS

| | | |
|---|---|---|
| CN | 1668107 A | 9/2005 |
| CN | 1725858 A | 1/2006 |
| CN | 1946184 A | 4/2007 |
| EP | 0 645 930 A1 | 3/1995 |
| EP | 1575300 A1 | 9/2005 |
| EP | 1 725 039 A1 | 11/2006 |
| JP | 10-136309 A | 5/1998 |

| | | | |
|---|---|---|---|
| JP | 2000-333169 A | 11/2000 | |
| JP | 2004-328150 A | 11/2004 | |
| JP | 2005-159444 A | 6/2005 | |
| JP | 2006-295852 A | 10/2006 | |
| JP | 2007-104558 a | 4/2007 | |
| RU | 2123769 C1 | 12/1998 | |
| RU | 2217880 C2 | 11/2003 | |

OTHER PUBLICATIONS

Jose I. Ronda, et al., "Rate Control and Bit Allocation for MPEG-4", IEEE Transactions on Circuits and Systems for Video Technology, vol. 9, No. 8, Dec. 1999, pp. 1243-1258.

\* cited by examiner

*Primary Examiner* — Thai Tran
*Assistant Examiner* — Stephen Smith
(74) *Attorney, Agent, or Firm* — Birch, Stewart, Kolasch & Birch, LLP

(57) ABSTRACT

A video recording apparatus compresses video data so that a bit rate converges to a target bit rate while keeping a minimum image quality and records the compressed video data. The video recording apparatus (exemplified by a recording and reproducing apparatus (10)) comprises a compressing portion (exemplified by a transcoder (13)) which compresses the video data while executing a rate control including a change of a quantization step so that a bit rate in a predetermined period converges to a target bit rate; a recording portion which records the compressed data in a recording medium; and a total rate calculation portion that calculates a total bit rate of a result of compression of the video data by the compressing portion from the start of the compression to the present time. The compressing portion comprises a quantization step limiting portion which limits the changed quantization step to a predetermined upper limit lower than an upper limit changeable in the compressing portion, and a quantization step fixing portion which fixes the quantization step to the predetermined upper limit when the calculated total bit rate exceeds the target bit rate.

6 Claims, 3 Drawing Sheets

VIDEO RECORDING APPARATUS

TECHNICAL FIELD

The present invention relates to a video recording apparatus that records data including video data.

BACKGROUND ART

Conventionally, a video recording apparatus is controlled so that a target bit rate will be reached within a certain period of time at the time of compressing data.

Recent years have seen development of an image recording device that records digital broadcast using a mass storage medium such as an HDD (Hard Disk Drive), a BD (Blu-Ray Disc), and a DVD (Digital Versatile Disk). Even the image recording device with such a mass storage medium is designed so that, with the target bit rate established, the bit rate converges within a certain period of time (in the order of several minutes).

Patent Document 1 discloses, with respect to an image encoding device that performs encoding based on a variable bit rate control, a technology of performing the rate control by setting a lower limit to a quantization scale in such a manner that actual storage capacity will be kept below a predicted value of the storage capacity of a recording medium, thereby avoiding encoding in excess of a target amount of information. Furthermore, Patent Document 1 also carries description of an intentional increase of the amount of information to be generated by conversely setting an upper limit to the quantization scale when an unlimited amount of information can be stored on the recording medium of the disc, etc.

PRIOR ART DOCUMENT

Patent Document

Patent Document 1: Japanese Laid-Open Patent Publication No. 2006-295852

SUMMARY OF THE INVENTION

Problems to be Solved by the Invention

The conventional technology, however, may occasionally sacrifice image quality for causing the bit rate to converge on the target bit rate. Setting the upper limit to the quantization scale as described in the Patent Document 1 will simply avoid sacrificing the image quality but may occasionally have no restraint on an increase of the bit rate depending on the type of the video, and unable to cause the bit rate to converge on the target bit rate. In the conventional technologies including the one described in Patent Document 1, an amount of codes is uniformly assigned even in the case of the recording that continues for a long time and in a scene requiring no such amount of codes.

The present invention has been conceived in view of the situation described above and the object thereof is to provide a video recording apparatus capable of compressing video data so that a bit rate converges to a target bit rate while keeping a minimum image quality and records the compressed video data.

Means for Solving the Problems

A first technical means of the present invention is a video recording apparatus having a compressing portion that compresses video data while executing a rate control including a change of a quantization step so that a bit rate in a predetermined period converges to a target bit rate, and a recording portion that records compression data compressed by the compressing portion in a recording medium, the video recording apparatus comprising: a total rate calculating portion that calculates a total bit rate that is a result of the compression of the video data by the compressing portion from the start of the compression until the present time, wherein the compressing portion includes: a quantization step limiting portion that limits the quantization step after the change so as not to exceed a predetermined upper limit that is lower than an upper limit changeable in the compressing portion; and a quantization step fixing portion that fixes the quantization step to the predetermined upper limit when the total bit rate calculated by the total rate calculating portion is in excess of the target bit rate.

A second technical means of the present invention is the video recording apparatus as defined in the first technical means, comprising: an amount of codes calculating portion that calculates an amount of codes obtained as a result of the compression of the video data by the compressing portion in the predetermined period or other predetermined period, wherein the quantization step fixing portion fixes the quantization step to the predetermined upper limit also when the amount of codes calculated by the amount of codes calculating portion is lower than a predetermined amount of codes.

A third technical means of the present invention is the video recording apparatus as defined in the first technical means, wherein the compressing portion removes the limit by the quantization step limiting portion when a recordable remaining capacity of the recording medium is lower than a predetermined remaining capacity.

A fourth technical means of the present invention is the video recording apparatus as defined in the first technical means, wherein the compressing portion releases the fixing by the quantization step fixing portion when a recordable remaining capacity of the recording medium is lower than a predetermined remaining capacity.

A fifth technical means of the present invention is the video recording apparatus as defined in the first technical means, comprising: an upper limit setting portion that sets the predetermined upper limit.

A sixth technical means of the present invention is the video recording apparatus as defined in the first technical means, comprising: a target setting portion that sets the target bit rate.

Effect of the Invention

According to the video recording apparatus of the present invention, it is possible to compress and record the video data so that the bit rate converges to the target bit rate while keeping the minimum image quality.

EMBODIMENTS OF THE INVENTION

A video recording apparatus according to the present invention is an apparatus that inversely quantizes compressed and coded video data and then requantizes the inversely quantized data for recording (apparatus including a transcoder), an apparatus that decodes the compressed and coded video data and then re-encodes the decoded data for recording (apparatus including a decoder and an encoder), or an apparatus having functions of both of these apparatuses. While the video recording apparatus according to the present invention will now be described by taking a recording/reproducing apparatus as an example, the video recording apparatus is not limited thereto.

Figure 1:
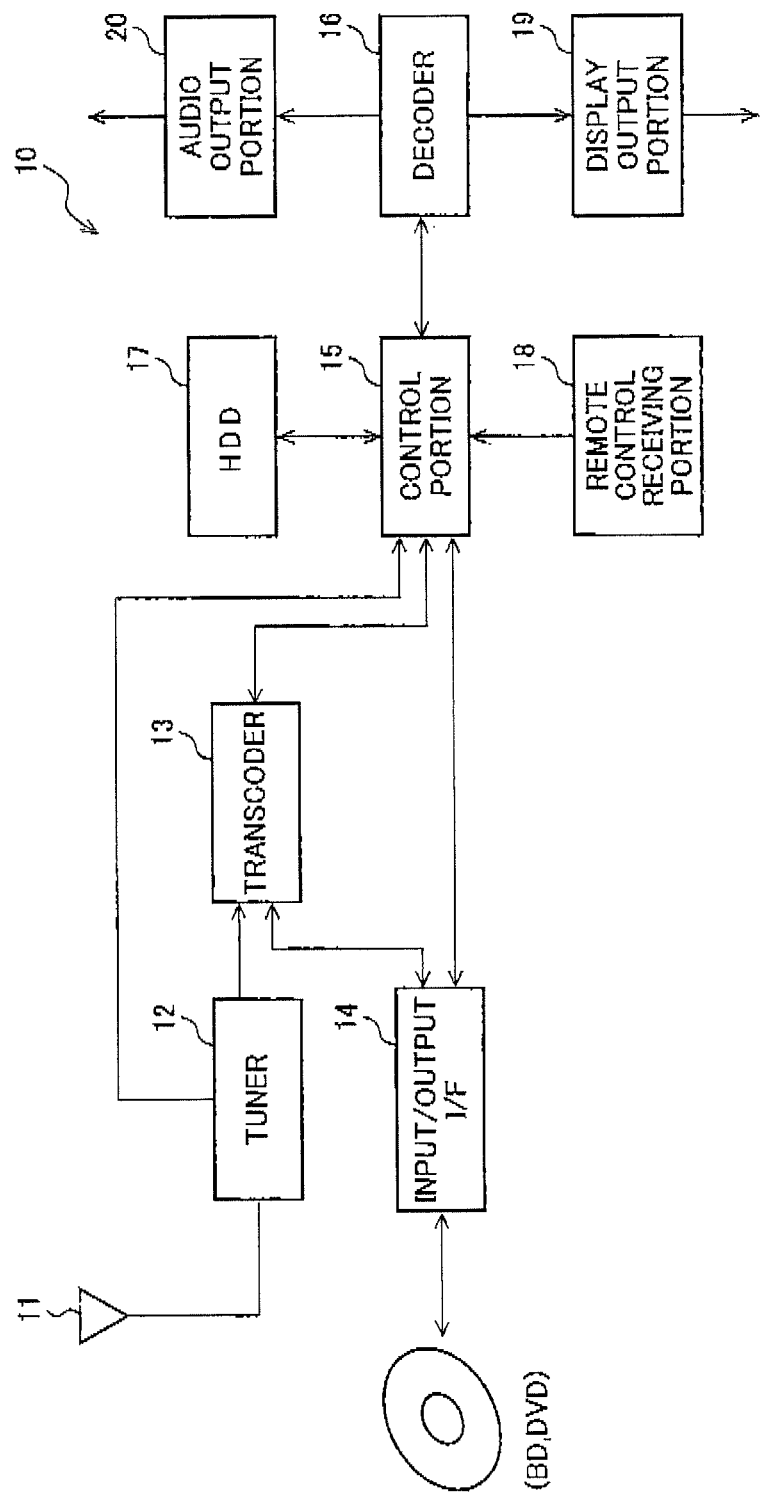
FIG. 1 is a block diagram of a configuration example of a recording/reproducing apparatus according to one embodiment of the present invention.

FIG. 1 is a block diagram of a configuration example of the recording/reproducing apparatus according to one embodiment of the present invention. A recording/reproducing apparatus 10 exemplified in FIG. 1 is equipped with a tuner 12, a transcoder 13, an input/output interface (input/output I/F) 14, a decoder 16, an HDD 17, a remote control receiving portion 18, a display output portion 19, audio output portion 20, and a control portion 15 composed of a CPU, a ROM, etc., to control the whole apparatus. The control portion 15 may store in the ROM, etc., a computer-readable program to execute such a procedure as described below so that the program can be executed by the CPU.

The tuner 12 is configured to be capable of receiving a digital broadcast wave. Of course, the tuner 12 may be configured to be capable of receiving both of an analog broadcast wave and the digital broadcast wave or may be configured to be capable of receiving only the analog broadcast wave. The tuner 12 is not required to be provided when a digital tuner is externally connected by a STB (Set Top Box), etc.

The input/output I/F 14, loaded with a portable recording medium such as a BD and a DVD, performs data input/output (writing/reading). As to the recording medium, besides these portable recording media, a hard disc of the HDD 17 is usable as a built-in recording medium but the built-in/portable recording medium is not limited thereto.

Thus, the recording/reproducing apparatus 10 can appropriately be configured, for example, as a hard disc recorder, a BD recorder, a DVD recorder, or the hard-disc-integrated BD recorder or DVD recorder, with a built-in digital tuner, or the hard disc recorder, the BD recorder, the DVD recorder, or the hard-disc-integrated BD recorder or DVD recorder, externally connectable to the digital tuner.

The remote control receiving portion 18 is equipped with a light receiving portion that receives an operational signal from an operation input portion such as a remote control and interprets the received operational signal and passes the interpreted signal to the control portion 15. Operation can also be made by means of an operational button (not shown) that is provided on the body of the recording/reproducing apparatus 10.

The display output portion 19 outputs video data and additional data of contents received by way of an antenna 11 or contents recorded in recording media to a display device (not shown). For example, a CRT (Cathode-ray Tube) device, a plasma display device, a liquid crystal display device, an organic/inorganic EL (electroluminescence) device, etc., can be used as this display device. The display output portion 19 outputs a list of recorded contents generated under control of the control portion 15, a list of thumbnails generated from specific recorded contents, etc., to the display device. The audio output portion 20 outputs audio data of the contents received by way of the antenna 11 or the contents recorded in the recording media to a speaker (not shown) as audio.

In the case of viewing digital broadcast using the recording/reproducing apparatus 10, the tuner 12 demodulates a high frequency signal (digitally modulated signal) input from the antenna 11 and inputs the demodulated signal to the decoder 16. After separating the input demodulated signal into a video signal, an audio signal, and an additional signal and decoding them, the decoder 16 generates a display control output signal and an audio control output signal synchronizing therewith from the decoded signals and outputs the display control output signal to the display output portion 19 and the audio control output signal to the audio output portion 20. The display control output signal is a signal related to the signal obtained by superimposing the decoded signal generated from the additional signal on the decoded signal generated from the video signal. The display control output signal output from the display output portion 19 is input to the display device with the speaker such as a television set connected to the recording/reproducing apparatus 10 and a user can view on a display screen thereof the video and additional information of a digital broadcast program corresponding to the display control output signal. The audio control output signal output from the audio output portion 20 is input to the display device with the speaker such as the television set connected to the recording/reproducing apparatus 10 and the user can hear from the speaker the audio of the digital broadcast program corresponding to the audio control output signal.

When the tuner 12 is configured to be capable of receiving analog broadcast, if the decoder 16 is also configured to be analog-compatible, the analog broadcast can be viewed and the processing is the same as described in the case of viewing the digital broadcast.

In the case of reproducing the contents recorded on the HDD 17 or the recording medium such as the BD by the recording/reproducing apparatus 10, the decoder 16, after decoding the data of the contents recorded on the HDD 17 or BD, etc., converts the video data and the additional data to a video-outputting format for outputting to the display output portion 19 and converts the audio data to an audio-outputting format and outputs it simultaneously with the video to the audio output portion 20. Reproduction of the data output to the display output portion 19 and the audio output portion 20 is the same as described with respect to the viewing of the digital broadcast.

In the case of directly recording the digital broadcast program (digital broadcast contents) using the recording/reproducing apparatus 10, the tuner 12 demodulates the high frequency signal (digitally modulated signal) and records it in the HDD 17 or various recording media such as the BD. In the recording/reproducing apparatus 10, the contents recorded in the portable recording medium such as the BD can be moved or accurately copied to the HDD 17 by way of the input/output I/F 14 and conversely, the contents recorded in the HDD 17 can be moved or accurately copied to the portable recording medium such as the BD by way of the input/output IF 14.

The case of rate-converting and recording received digital broadcast program or already recorded contents using the recording/reproducing apparatus 10 will then be described together with primary features of the present invention.

The transcoder 13 provided in the recording/reproducing apparatus 10 is one example of a compressing portion for performing compression processing by inversely quantizing the compressed and coded video data, changing the quantization step (alternatively referred to as quantization width, quantization scale, quantization coefficient, etc.), and then re-quantizing the data.

The transcoder 13 is configured to be capable of performing the compression processing on the input data (incoming bitstream) without changing the standard and outputting the compressed data (outgoing bitstream). The transcoder 13 is also configured to be capable of converting the input data to the data of a standard different from that of the input data such as the conversion of TS data of MPEG (Moving Picture Experts Group)-2 standard to the TS data of H.264/AVC (Advanced Video Coding) standard. Since the compression processing itself of the present invention has only to be executed based on the standard to be employed, details thereof will not be described.

As to the data to be input to the transcoder 13, the data of the broadcast contents received by way of the tuner 12, the data of the contents recorded on the portable recording medium such as the BD input from the input/output I/F 14, and the data of the contents read out by the HDD 17 can be cited. Therefore, the transcoder 13 is capable of compressing the data of the received broadcast contents to output it to the input/output I/F 14 for recording in the portable recording medium such as the BD or to output it to the HDD 17 for recording in a recording area of the HDD 17, compressing the data read out from the HDD 17 to output it to the input/output I/F 14 for recording in the portable recording medium such as the BD, and compressing the data read out by the input/output I/F 14 from the portable recording medium such as the BD to output it for recording in the HDD 17.

The recording/reproducing apparatus 10 is equipped with a recording portion of recording (writing) the data compressed by the transcoder 13 in the recording medium, as exemplified by the input/output I/F 14 and the HDD 17. That is to say, the data output from the transcoder 13 can be recorded in the recording medium such as the BD by way of the input/output I/F 14 or can be recorded in the HDD 17.

In the present invention, the compressing portion compresses the video data while executing a rate control (variable bit rate control) so that the bit rate in a predetermined period T1 converges to the target bit rate. Here, the bit rate within the predetermined period refers to the bit rate as a result of the compression processing of the video data from before the predetermined period T1 until the present time. It is assumed that the variable bit rate control to be executed in the present invention includes a change of the quantization step. This change (adjustment) is made so that an amount of codes after the compression is kept constant.

An amount of information of the data to be compressed is large in the case of a fine display image and is small in the case of a coarse display image (flat image). The amount of information is large in the case of much movement and small in the case of little movement. Therefore, when the data to be compressed has a large amount of information, namely, in the case of the video scene of the fine image or of much movement, a large quantization step is employed. Conversely, when the data to be compressed has a small amount of information, namely, in the case of the video scene of the coarse image or of little movement, a small quantization step is employed. The way of determining the quantization step like this enables such a control that makes the amount of codes after the compression constant.

A specified value may be used for the target bit rate but it is preferable that the recording/reproducing apparatus 10 is configured to be settable by the user's operation. That is to say, it is preferable that the recording/reproducing apparatus 10 is equipped with a target setting portion for setting the target bit rate. The predetermined period T1 as well may be configured to be settable.

The compressing portion is equipped with a quantization step limiting portion and a quantization step fixing portion. These two portions are portion for loosely performing the setting of the variable bit rate control to maintain the image quality, on a premise that recording is made in the HDD 17 or a mass storage medium such as the BD in image compression processing (here, transcoding processing of the transcoder 13).

The quantization step limiting portion limits the quantization step after the change by the rate control so as not to exceed a predetermined upper limit. Here, it is assumed that the predetermined upper limit is the value lower than the upper limit changeable in the compressing portion (generally, the upper limit of the specification employed in the compressing portion). A specified value may be used for the predetermined upper limit but it is preferable that the recording/reproducing apparatus 10 is configured to be settable by the user's operation. That is to say, it is preferable that the recording/reproducing apparatus 10 is equipped with an upper limit setting portion for setting the predetermined upper limit.

Thus, in order to give priority to the image quality and maintain the minimum image quality, the quantization step limiting portion sets the predetermined upper limit that is a value lower than the apparatus-dependent upper limit to the quantization step and limits the quantization step to be changed to the predetermined upper limit. Thus, the compressing portion is able to perform the rate control so that the bit rate converges to the target bit rate within the range not exceeding the predetermined upper limit by operating the quantization step limiting portion and as a result, to maintain the minimum image quality. Since this assumes the use of the mass storage medium, there is little possibility of capacity shortage. Processing in the case of low storage capacity will be described later.

A specific limiting method may be, for example, to seek such a quantization step that enables the bit rate to converge to the target bit rate without the predetermined upper limit, take such a quantization step as an input, and determine and output the predetermined upper limit as the quantization step after the change when the quantization step larger than the predetermined upper limit is input. Likewise, the specific limiting method may be to seek such a quantization step that enables convergence, input such a quantization step into a predetermined function defined by the predetermined upper limit, and output results of calculation as the quantization step after the change. As for a simple example of the function, the function can be cited that linearly assigns one to the predetermined upper limit as an output to an input of one to the apparatus-dependent upper limit.

The limitation by the quantization step limiting portion alone is capable of securing the minimum image quality but it is necessary to ensure that the actual bit rate as viewed in a longer span of time will not largely depart from the default or the target bit rate set by the user. This is because unless consumption of memory space beyond expectation is avoided, more memory space is consumed than expected by the user. To avoid such a situation, the quantization step fixing portion is provided as follows.

The quantization step fixing portion fixes the quantization step at the predetermined upper limit when a total bit rate is in excess of the target bit rate. Here, it is assumed that the total bit rate is the data calculated by the following total rate calculating portion.

The total rate calculating portion calculates the amount of codes per unit time as a result of the compression of the video data by the compressing portion from the start of the compression until the present time (as of the time of calculation), namely, the actual total bit rate from the start of the compression by the compressing portion until the present time. In the example of FIG. 1, the control portion 15, in cooperation with the transcoder 13, calculates (measures) the total bit rate from the start of the transcoding. The total bit rate may be calculated when, after the start of compression (conversion), the bit rate has converged by the rate control within the range not exceeding the predetermined upper limit (e.g., about 10 minutes). Subsequent calculation executing timing as well may be determined likewise. As to a separate timing, the calculation may be executed every time when a certain period of time (e.g., 15 minutes) elapses.

The convergence in this case is obtained from the degree of change of the bit rate as a result of the rate control within the range not exceeding the predetermined upper limit, and naturally, there are cases in which the bit rate converges to the bit rate higher than the target bit rate. Therefore, the bit rate can be caused to converge to the target bit rate by mandatorily performing the fixing to the predetermined upper limit.

The following method can be cited as a method for obtaining the actual bit rate by the control portion 15. The transcoder 13 counts the volume of the data that it has compression-processed, divides it by the compression time to calculate the total bit rate to store in an internal register. The transcoder 13 periodically notifies the control portion 15 of the total bit rate. The control portion 15 may read out the total bit rate stored in the internal register at appropriate timing. While the control portion 15 transfers the compressed data from the transcoder 13 by DMA (Direct Memory Access) without involving the built-in main CPU, the control portion 15 can also calculate the total bit rate by counting the transfer data and dividing the file size from the compression start obtained from the count value by the compression time. The file size can be obtained by counting the number of packets of the DMA transfer and multiplying the counted number by the transfer size per one time.

When the total bit rate is in excess of the target bit rate due to the quantization step fixing portion, increasing the quantization step up to the predetermined upper limit enables such a rate control that brings the total bit rate close to the target bit rate and as a result, enables avoiding waste of more memory space than expected by the user.

The quantization step limiting portion and the quantization step fixing portion described above make it possible to realize the loose rate control and to compress and record the video data so that the bit rate converges to the target bit rate with the minimum image quality maintained. In particular, use of the mass storage medium, which has room for the recording time until the convergence, makes it possible to ensure that the bit rate will finally converge to the desired target bit rate. The upper limit used for fixing in the quantization step fixing portion may be different from the predetermined upper limit used for limiting in the quantization step limiting portion.

Even in a video scene not requiring much amount of codes such as, for example, the video scene that has a continuation of a flat display image and has a small amount of information, it is preferable to set the quantization step to the predetermined upper limit and perform the control so as to keep a certain degree of image quality. Such control will then be described.

The recording/reproducing apparatus 10 is equipped with an amount of codes calculating portion for calculating the amount of codes (total amount of codes (total bit)) obtained as a result of the compression of the video data by the compressing portion within the predetermined period T1, or other predetermined period T0, up to the present time. This amount of codes calculating portion can also be considered as a scene distinguishing portion for distinguishing a specific video scene from results of the compression of the video data by the compressing portion. In the example of FIG. 1, the control portion 15, in cooperation with the transcoder 13, calculates (measures) the amount of codes as a result of the compression within the predetermined period T1 or T0 up to the present time.

The quantization step fixing portion fixes the quantization step to the predetermined upper limit even when the total amount of codes within the predetermined period T1 or T0 calculated by the amount of codes calculating portion is smaller than a predetermined amount of codes. In place of the total amount of codes, the total bit rate within the predetermined period T1 or T0 may be calculated to undergo threshold processing.

This makes it possible to keep a certain degree of image quality in the scene not requiring much amount of codes. The upper limit used for fixing when the total bit rate is in excess of the target bit rate and the upper limit used for fixing when the amount of codes is smaller than the predetermined amount of codes may be different from each other and may also be different from the predetermined upper limit used for limiting the quantization step.

The rate control will then be described at the time of the disc capacity becoming low. When the disc capacity becomes low, a strict variable bit rate control without using the predetermined upper limit is performed so that the user's convenience will not be impaired.

For this reason, it is preferable for the compressing portion to cancel the limit by the quantization step limiting portion when a recordable remaining capacity R of the recording medium becomes lower than a predetermined remaining capacity R1. That is to say, when the remaining capacity comes to R<R1, it is preferable to stop the operation of the quantization step limiting portion and perform an ordinary rate control without the limitation to the predetermined upper limit. Here, the ordinary rate control refers to changing of the quantization step so that the bit rate obtained by compressing the video data within the predetermined period T1 converges to the target bit rate, without the limitation to the predetermined upper limit.

It is preferable for the compressing portion to release the fixing by the quantization step fixing portion when the recordable remaining capacity R of the recording medium becomes lower than the predetermined remaining capacity R1. That is to say, when the remaining capacity comes to R<R1, it is preferable to stop the operation of the quantization step fixing portion and perform an ordinary rate control without the fixing of the quantization step by the quantization step fixing portion. Here, the ordinary rate control refers to changing of the quantization step so that the bit rate obtained by compressing the video data within the predetermined period T1 converges to the target bit rate, without the fixing to the predetermined upper limit.

It is preferable that the canceling of the limitation and the release of the fixing is executed at the same time and in such a case, it is preferable that the predetermined remaining capacity to be a threshold is common to the cancel of the limitation and the release of the fixing but different thresholds may be used.

Figure 2:
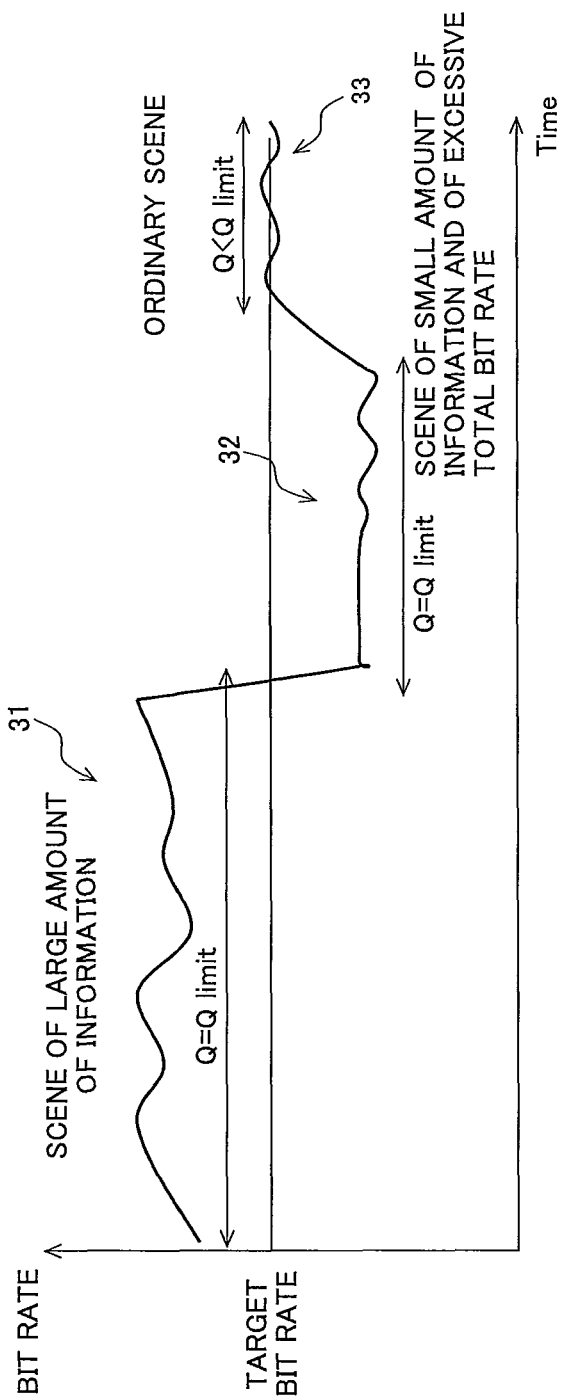
FIG. 2 is a time-series graph of one example of the bit rate when certain video data is compressed and recorded on a recording medium by processing in the recording/reproducing apparatus of FIG. 1.
Figure 3:
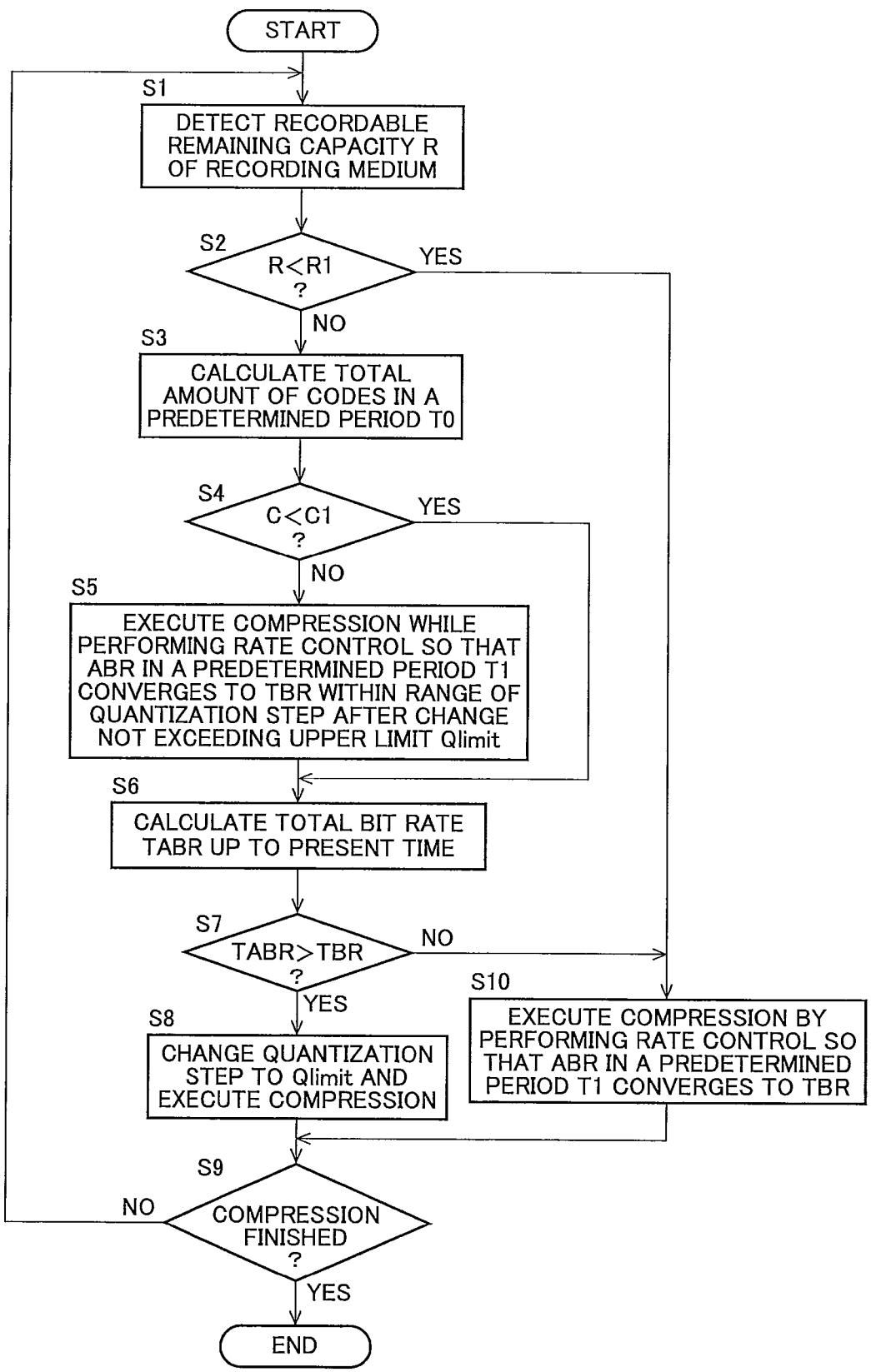
FIG. 3 is a flowchart for description of a processing example in the recording/reproducing apparatus of FIG. 1.

One example of the processing in the recording/reproducing apparatus 10 will be described in the case of applying the application examples described above referring to the FIGS. 2 and 3. FIG. 2 is a time-series graph of one example of the bit rate when certain video data is compressed and recorded in the recording medium by the processing in the recording/ reproducing apparatus of FIG. 1. FIG. 3 is a flowchart for description of a processing example in the recording/reproducing apparatus of FIG. 1.

The recording/reproducing apparatus 10 of FIG. 1 compresses and records the video data, employing the following processing method. Firstly, the control portion 15 detects the recordable remaining capacity R of the recording medium specified as a destination for recording, at the same time or before the start of recording (step S1). Then, the control portion 15 determines whether R<R1 is applicable (step S2).

In the case of YES at step S2, namely, if the storage capacity has no room, then the control portion 15 instructs accordingly and the transcoder 13 executes the compression, performing the rate control so that the bit rate (ABR: Actual Bit Rate) within the predetermined period T1 up to the present time converges to the target bit rate (TBR), without performing the limitation by the predetermined upper limit Qlimit or the fixing to the Qlimit (step S10).

Following step 10, the control portion 15 determines whether the video data to be compressed is finished (step S9). If the data is finished, then this processing comes to end and if the video data to be compressed is still remaining, then the flow goes back to step S1 for continuing the processing on the remaining video data.

On the other hand, in the case of NO at step S2, namely, if the storage capacity has sufficient room, then the flow goes to step S3. At step S3, the control portion 15, in cooperation with the transcoder 13, calculates the total amount of codes C within the predetermined period T0 up to the present time. Following this calculation, the control portion 15 determines whether the total amount of codes C is smaller than the predetermined amount of codes C1 (step S4).

In the case of NO at step S4, the control portion 15 instructs accordingly and the transcoder 13 executes the compression, performing the rate control so that the bit rate within the predetermined period T1 up to the present time converges the target bit rate, within the range of the quantization step after the change not exceeding the Qlimit (step S5). This processing causes the video scene of a large amount of information to be compressed at the Qlimit as indicated by reference numeral 31 of FIG. 2 and the video scene of an average amount of information to be compressed by the quantization step of less than the Qlimit as indicated by reference numeral 33 of FIG. 2.

Following step S5, the control portion 15, in cooperation with the transcoder 13, calculates the total bit rate (TABR: Total Actual Bit Rate) up to the present time (step S6). Then, the control portion 15 determines whether TABR>TBR is satisfied (step S7). In the case of YES at step S7, namely, if the compression results up to now exceed the target bit rate, then the control portion 15 instructs accordingly and the transcoder 13 mandatorily changes the quantization step to the Qlimit and executes the compression by the Qlimit as a fixed value (step S8). On the other hand, in the case of NO at step S7, the flow goes to step S10 and executes the ordinary rate control.

Also in the case of YES at step S4, namely, when the total amount of codes C within T0 up to the present time is smaller than C1, the flow goes to step S6. Thus, only in the case of YES at step S4 and YES at step S7, namely, when the amount of information is small and when the total bit rate is in excess of the target bit rate, the compression is executed by the Qlimit as indicated by reference numeral 32 of FIG. 2. The quantization step is changed to the Qlimit and the compression can be executed by this Qlimit as the fixed value. As for other example, in the case of YES at step S4, the flow may go to step S8, where the quantization step is mandatorily changed to the Qlimit without determination of the storage capacity and the compression is executed by this Qlimit as the fixed value.

After the processing at step S8, in the same manner as after the processing at step S10, the flow goes to step S9. In the case of YES at step S9, the processing is finished and in the case of NO, the flow goes back to step S1 for continuing the processing on the remaining video data.

Intervals of the processing of FIG. 3 may be arranged by compression unit in the compressing portion. Time at least larger than the compression unit is employed as the predetermined period T0 or T1. While the description referring to FIGS. 1 to 3 has been made on the premise that the control within the predetermined period T0 or T1 is the control based on the data going back by T0 or T1 to the past from the present time, the control may be the one based on the data at a predetermined interval (predetermined cycle) T0 or T1. With respect to the control at the predetermined cycle, when the control at the previous cycle is finished and the control at the next cycle is ongoing, even at the point when the predetermined interval has not yet been satisfied, the control may be executed with only the data that is present after the start of that cycle.

While, with respect to the video recording apparatus according to the present invention, the recording/reproducing apparatus 10 as shown in FIG. 1 was cited as the example of being equipped with the device that inversely quantizes the compressed and coded video data and then re-quantizes the inversely quantized data for recording (transcoder), the video recording apparatus can be the apparatus that decodes the compressed and coded video data and then re-encodes the decoded data for recording (apparatus including encoder), as described above.

That is to say, the compressing portion in the present invention is not limited to the portion for inversely quantizing the video data, followed by rate-converting and quantizing as exemplified by the transcoder 13 but can be configured as the portion for re-encoding what is obtained by decoding the compressed and coded video data. To describe in the example of FIG. 1, the recording/reproducing apparatus 10 may be equipped with an encoder capable of the variable bit rate control described above in place of the transcoder 13 and be configured to cause such an encoder to re-encode the video data decoded by the decoder 16. The recording/reproducing apparatus 10 can be equipped with this encoder together with the transcoder 13 and be configured to be capable of performing compression by both of the re-quantizing processing and the re-encoding processing.

When the recording/reproducing apparatus 10 is configured to be capable of receiving the analog broadcast and the received analog broadcast is recorded, it may be so arranged that the high frequency signal (analog modulated signal) input from the antenna 11 is demodulated by the tuner 12, the demodulated signal is encoded by the encoder capable of the variable bit rate control described above, and the encoded data is converted to a recording-suitable format (e.g., program stream) to be recorded in the HDD or the recording medium such as the BD.

EXPLANATIONS OF REFERENCE NUMERALS

10 . . . recording/reproducing apparatus, 11 . . . antenna, 12 . . . tuner, 13 . . . transcoder, 14 . . . input/output I/F, 15 . . . control portion, 16 . . . decoder, 17 . . . HDD, 18 . . . remote control receiving portion, 19 . . . display output portion, 20 . . . audio output portion

The invention claimed is:

1. A video recording apparatus having a compressing portion that compresses video data while executing a rate control including a change of a quantization step so that a bit rate in a predetermined period converges to a predetermined target bit rate, and a recording portion that records compression data compressed by the compressing portion in a recording medium, the video recording apparatus comprising:
   a total rate calculating portion that calculates a total bit rate that is a result of the compression of the video data by the compressing portion from the start of the compression until the present time, wherein
   the compressing portion includes:
   a quantization step limiting portion that limits the quantization step after the change so as not to exceed a predetermined upper limit that is lower than an upper limit changeable in the compressing portion; and
   a quantization step fixing portion that compares the total bit rate calculated by the total rate calculating portion and the predetermined target bit rate and fixes the quantization step to the predetermined upper limit when it is determined that the total bit rate is in excess of the predetermined target bit rate, wherein the fixing sets the quantization step to a value that prevents excess amount of memory to be used beyond an expected predetermined amount.

2. The video recording apparatus as defined in claim 1, comprising:
   an amount of codes calculating portion that calculates an amount of codes obtained as a result of the compression of the video data by the compressing portion in the predetermined period or other predetermined period, wherein
   the quantization step fixing portion fixes the quantization step to the predetermined upper limit also when the amount of codes calculated by the amount of codes calculating portion is lower than a predetermined amount of codes.

3. The video recording apparatus as defined in claim 1, wherein
   the compressing portion removes the limit by the quantization step limiting portion when a recordable remaining capacity of the recording medium is lower than a predetermined remaining capacity.

4. The video recording apparatus as defined in claim 1, wherein
   the compressing portion releases the fixing by the quantization step fixing portion when a recordable remaining capacity of the recording medium is lower than a predetermined remaining capacity.

5. The video recording apparatus as defined in claim 1, comprising:
   an upper limit setting portion that sets the predetermined upper limit.

6. The video recording apparatus as defined in claim 1, comprising:
   a target setting portion that sets the predetermined target bit rate.

* * * * *